United States Patent [19]

Smith

[11] 3,867,024

[45] Feb. 18, 1975

[54] RACK ASSEMBLY
[75] Inventor: Tom F. Smith, Urbana, Mo.
[73] Assignee: United States T.R.A.D. Corporation, Springfield, Mo.
[22] Filed: Mar. 5, 1973
[21] Appl. No.: 338,318

[52] U.S. Cl. ................... 353/82, 352/134, 352/244, 353/94, 353/99, 353/101
[51] Int. Cl.... G03b 21/14, G03b 21/28, G03b 3/00
[58] Field of Search ......... 353/82, 94, 99, 100, 101, 353/122; 352/104, 133, 134, 244

[56] References Cited
UNITED STATES PATENTS
2,779,237   1/1957   Smith..................................... 353/94

Primary Examiner—Harry N. Haroian
Assistant Examiner—Steven L. Stephan
Attorney, Agent, or Firm—Lowe, Kokjer, Kircher

[57] ABSTRACT

A projected image upon leaving a motion picture projector is reflected to a lens cluster board having a number of independently supported lenses thereon. Each lens is constructed to provide a discreet image from the single projected image and to transmit the discreet images for reflection to predetermined locations. A unitary rack is constructed so as to support the reflectors and the lens cluster board relative to each other. In this manner, a grouping may be constructed at one location and then positioned at the desired location relative to the projector for proper operation.

8 Claims, 10 Drawing Figures

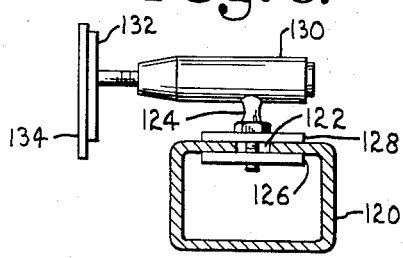
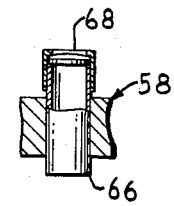
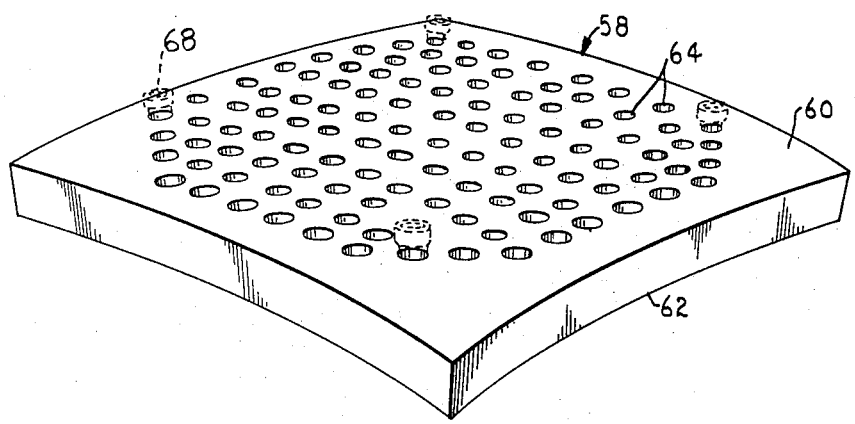

RACK ASSEMBLY

BACKGROUND AND BRIEF DESCRIPTION OF THE INVENTION

This invention relates to an improvement in outdoor drive-in theaters having a motion picture projector and individual car screens. The original concept was disclosed in U.S. Pat. No. 2,779,237, and issued to Tom F. Smith. A separate lens for each car screen is provided to form a discreet image from the projected image with each discreet image then being transmitted through its own series of reflectors until directed to its particular screen. This positioning of the series of reflectors relative to each independent lens is somewhat critical since each discreet image is to be positioned on its screen and the car screens are positioned in a circle fashion about the projector. Accordingly, a substantial amount of work is required when constructing such a drive-in theater due to the individual attention necessary for positioning the series of mirrors for each discreet image being projected so that a properly oriented picture on the screen may be obtained.

The present invention comprises a unitized frame holding a lens cluster board containing individual lenses to produce discreet images for each car screen. The frame supports a discreet image reflector relative to the cluster board and, on the other side of the board, a projecting image reflector is supported by the frame relative to the cluster board.

One of the advantages in the construction of drive-in theaters is that the cluster board holding frame may be prefabricated at one location and then transported to the location where the outdoor drive-in is being constructed. The frame is then positioned relative to the projector so that each lens may be properly positioned to focus the discreet image on its respective car screen. Accordingly, the individual attention and effort necessary to position the series of mirrors for each discreet image is lessened because each mirror series is substanially positioned during the initial fabrication.

One of the primary object of the present invention is to provide a unique rack assembly, of unitized construction, that enables discreet images from a single projector image to be reflected on a predetermined location.

A further object of the present invention is to provide a unique rack assembly for use in a drive-in theater having three point suspension for adjustment of the rack relative to a projector.

A further object of the present invention is to provide a unique rack assembly for use in a drive-in theater supporting a first relector positioned ahead of a second reflector to reflect an image from a projector to apparatus for obtaining discreet images which are in turn reflected from said first reflector to a predetermined location.

A further object of the present invention is to provide a unique rack assembly having apparatus for creating discreet images from a single projected image supported by three point suspension to permit movement of said discreet image creating apparatus relative to a reflector reflecting said discreet images to a predetermined location.

A still further object is to provide a uniquely constructed cluster board for holding a plurality of lenses. It is a feature of this object that each lens is tube mounted and that the tubes are adjustable to thereby permit optimum focusing for discreet image transmission and reflection.

These and other objects of the invention, together with the features of novelty appurtenant thereto, will appear in the course of the following description.

DETAILED DESCRIPTION OF THE INVENTION

In the accompanying drawings which form a part of this application and are to be read in conjunction therewith, and in which like reference numerals are employed to indicate like parts in various views:

FIG. 8 is an enlarged side elevational view of point mirror reflectors that may be used with the rack assembly of FIG. 1;

FIG. 9 is a perspective view showing one form of a lens cluster board used with the rack assembly of FIG. 1; and FIG. 10 is an enlarged elevational view of a lens supported within the lens cluster board of FIG. 9 with certain portions in section.

Figures 1, 2:
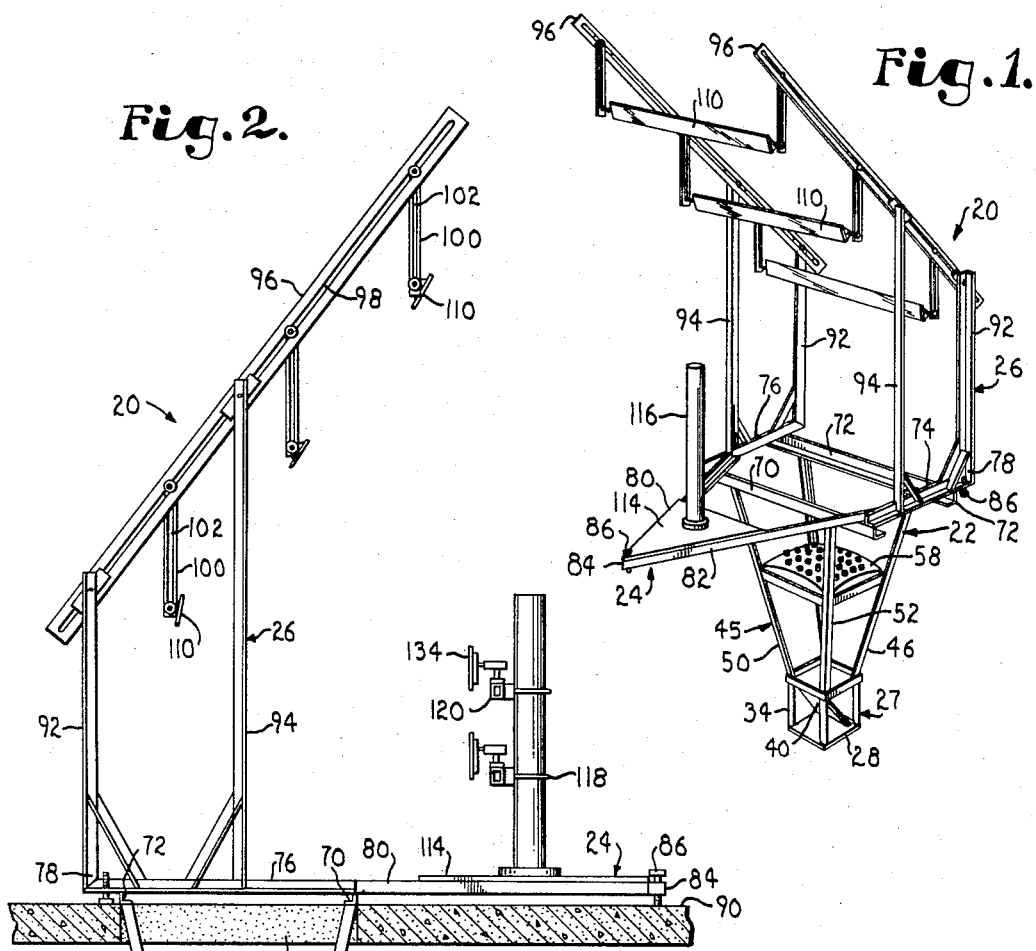
FIG. 1 is a perspective view showing one form of a rack assembly embodying the present invention.
FIG. 2 is an enlarged side elevational view of the rack assembly of FIG. 1.
Figure 3:
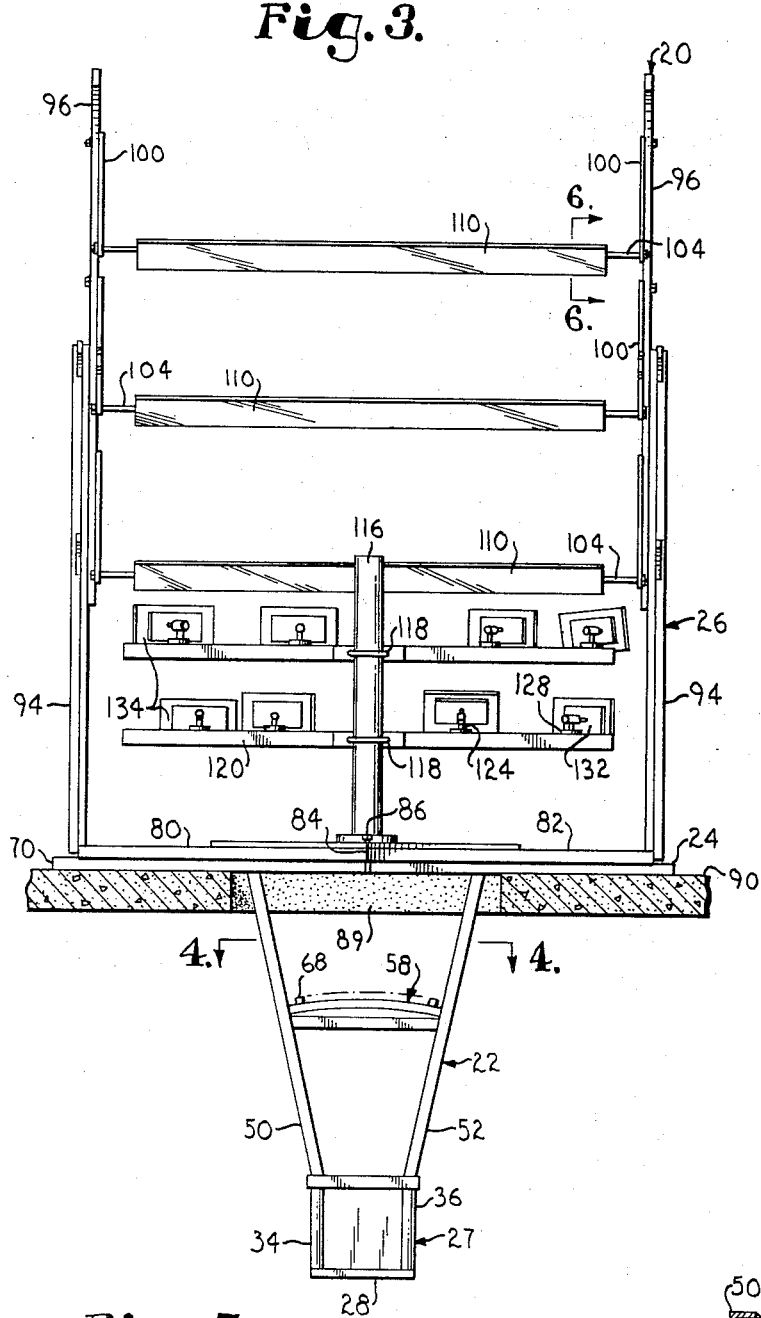
FIG. 3 is an enlarged front elevational view of the rack assembly of FIG. 1.

Turning now to the drawings and more particularly to FIGS. 1–3, a unitary rack assembly 20 is constructed with a bottom section 22, a middle support section 24, and an upper section 26. Rack 20 is constructed of conventional material (such as steel angles) providing sufficient rigidity to resist slight movement and with bottom 22, middle 24 and upper section 26 weldedly connected in a conventional manner.

Figure 5:
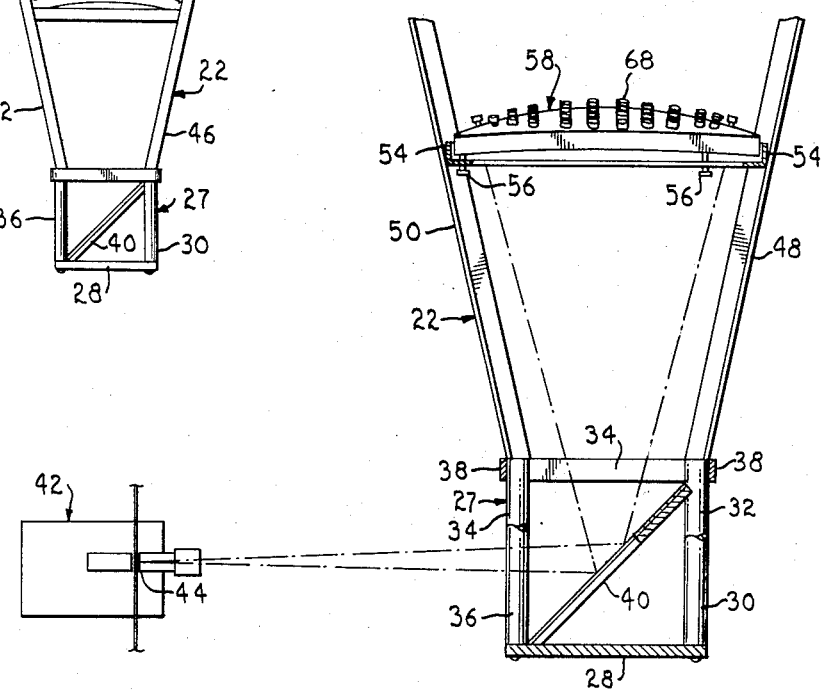
FIG. 5 is a side elevational view taken in the direction of the arrows along line 5—5 of FIG. 4 with portions thereof shown in section.

The lowest portion of bottom section 22 has a box-like frame structure 27 (see FIG. 5) with the bottom of this structure being formed by rectangular plate 28 with vertical angles 30, 32, 34 and 36 positioned at each corner of the plate. Securing strips 38 connect the tops of vertical angles 30 to 32, 32 to 34, 34 to 36 and 36 to 30. A mirror 40 is positioned upon plate 28 and within vertical angles 30, 32, 34 and 36, so that a horizontal image projected from a projector 42, having a framing aperture 44, is reflected vertically by mirror 40. It should be noted that angles 30, 32, 34 and 36 are connected by strips 38 in the above manner to avoid interferring with the projected image reflected by mirror 40 supported within structure 27.

Figure 4:
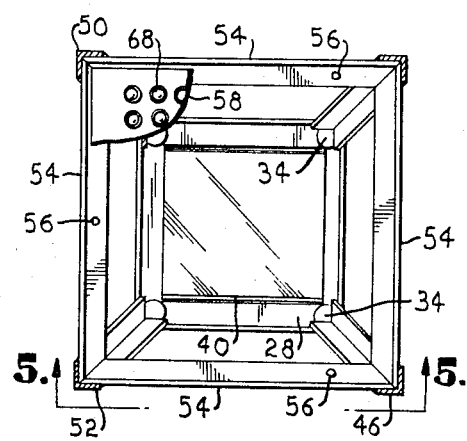
FIG. 4 is an enlarged plan view taken in the direction of the arrows along line 4—4 of FIG. 3 with portions thereof being in section.

Attached to the top of box-like structure 27 is a frame forming an inverted truncated pyramid-like shape. This inverted pyramid-like shape is formed by the bottom of angled structurals 46, 48, 50 and 52 being connected to vertical angles 30, 32, 34 and 36, respectively; each structurally positioned with the apex of its angle pointing in the same direction as the corners on plate 28 and with the upper portion of the structurals being further apart than the bottom (see FIG. 4). This pyramid-like shape is similar to lower box-like frame 27 in that there is no interference with the image reflected by mirror 40.

Disposed upwardly of securing strips 38 and connecting structural 46 to 48, 48 to 50, 50 to 52, and 52 to 46 are angle supports 54 with the lower horizontal portions of same forming a support surface. Holes are drilled and tapped in the lower horizontal portions of right angle supports 54 for placement of screws 56 which may be positioned in any three of the four supports 54. In any event, each screw 56 is separated sufficiently from the other screws 56 to provide a stable support for a later described lens cluster board 58. Accordingly, a three point suspension is created for lens cluster board 58 which permits adjustment of the degree of pitch and roll of board 58 relative to plate 28.

The above mentioned lens cluster board 58 is best seen in FIGS. 9 and 10 and is formed with a convex side 60 facing away from the projected light source reflected by mirror 40 and with a concave side 62 facing the reflected light source. Also, when viewed from above (FIG. 4), board 58 is of a rectangular shape so as to fit within the raised portion of angle supports 54 and rest on screws 56 within the lower horizontal portions of supports 54. All holes of 64, arranged in rows across board 58, are pointing toward the location of framing aperture 44 in projector 42 as reflected by mirror 40.

A lens corresponding to each hole (64) will be mounted and supported by board 58. In actual practice, holes 64 have a sufficient diameter to permit a sidable fit for a lens tube 66 (see FIG. 10). A lens 68 is positioned within each lens tube 66 with the length of each tube being sufficient to allow sufficient sliding within its corresponding hole to permit the focusing of each individual discreet image on its respective car screen. The number of holes 64 with lens tube 66 therein is determined by the number of car screens in the drive-in theater. In the present embodiment, 120 holes have been provided in board 58 for a corresponding number of car screens.

The middle support section 24, when viewed from above, is best described as a horizontally supported rectangle with an A-shape partially disposed within the rectangle. The rectangle is formed by parallel sides 70 and 72 connecting structurals 50 to 52 and 46 to 48, respectively. Transverse side members 74 and 76 extend between sides 70 and 72 to complete the rectangle. Also, transverse side members 74 and 76 extend past side 72 to form extensions 78. The size of the rectangle is such that no portion of rack assembly 20 will interfere with the discreet light images passing through the opening formed by sides 70, 72, 74 and 76. The A-shape is formed by side 70 acting as the cross-member and connecting leg 80 to 82, which terminate at apex 84 of the A-shape. Screws 86, in mating engagement with support section 24, are disposed of in extensions 78 and at apex 84. Accordingly, the individual adjustment of screws 86 will permit adjustment of the degree of pitch and roll of rack assembly 20 when the bottom section 22 has its upper portion extending through an opening 89 in a supporting surface 90. It is contemplated that surface 90 could be the concrete floor of a projection house which is constructed for stability and to be vibration resistant.

Figure 6:
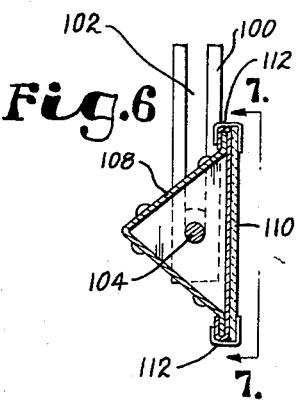
FIG. 6 is an enlarged side elevational view of a bar mirror and bracket taken in the direction of the arrows along line 6-6 of FIG. 3.
Figure 7:
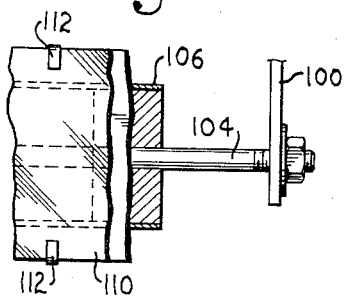
FIG. 7 is an enlarged front elevational view taken in the direction of the arrows along line 7—7 of FIG. 6 with certain portions being in section.

The top of rack assembly 20 is formed by a vertical post 92 being connected to each extension 78 of support section 24. Another vertical post 94, being longer than post 92, is connected to the side membes 74 and 77 as shown in FIGS. 1 and 2. An incline riser 96 is connected to the upper ends of each post 92 and 94 and has a slot 98 extending longitudinally thereof. Three brackets 100 (see FIG. 6) are removably attached to each raiser 96 through slot 98 therein. Each bracket 100 has a slot 102 therein to permit a rod 104 to pass therethrough, thereby interconnecting two brackets 100 (note FIGS. 3, 6 and 7). Near each end of each rod 104 is a triangularly shaped plug 106 with rod 104 axially disposed through aligned apertures (not shown) therein. Circumscribing two sides of the triangular plug 106 is a triangular (when viewed from the end) bar mirror support 108 with a bar mirror 110 located adjacent the third side of plug 106.

Spring biased "C" clamps 112 are provided along bar mirror support 108 to hold bar mirror 110 in position.

The width of bar mirrors 110 is selected so that a predetermined number of rows of the discreet images passing through lenses 68 in cluster board 58 will be reflected from the particular bar mirror. The length of bar mirrors 110 is sufficient so that all discreet images passing through lens 68 within the rows selected for reflection will be reflected therefrom.

Upon passage of the discreet images from bar mirrors 110, each image will be reflected by a point mirror 134 to the individual car screen. These point mirrors (134) are normally supported from surface 90. However, a portion of these point mirrors may be carried by support section 24 from a structure formed by placing a triangular shaped plate 114 between legs 78 and 80 with a point of the plate triangle at apex 84. Pipe 116 may then be mounted on plate 114 to extend upwardly therefrom. Connected to pipe 116 by means of a U-clamp 118 (FIG. 2) is a square shaped tube 120 with a slot 122 extending longitudinally thereof, as best seen in FIG. 8. Passing through slot 122 and transverse to the side of tube 120 is a screw support member 124. A plate clamp 126 mating with the threads of screw 124 is positioned within tube 120. On the exterior side of tube 120, opposite plate clamp 126, and disposed around screw 124 is a blocking plate 128. Accordingly, by turning screw 124 and the coaction of clamping plate 126 and blocking plate 128, the screw support member 124 is fixed in the desired position along tube 120. An elongated sleeve nut 130 is attached to screw 124. Mating with sleeve nut 130 is an enlarged headed screw 132. The enlarged head of screw 132 acts as a supporting surface for point mirror 134, which reflects a discreet image to the car screen.

In operation, frame 20 could be fabricated and then moved to the location where a drive-in theater is being constructed. The location of frame 20 relative to a projector 42 will depend on the focal length of lens 68 within cluster board 58. That is, should the focal length of lens 68 be 32 inches, then lens 68 must be within 32 inches of aperture 44 in projector 42. This 32 inches includes the distances from lens 68 to mirror 40 and from mirror 40 to the aperture 44.

After frame 20 has been properly located, the adjustment of screws 86 is performed to position the frame 20 relative to surface 90. This positioning aligns box-like structure 27 with projector 42 so that the projected image passes through the opening circumscribed by plate 28, vertical angles 34 and 36 and strip 38, and aligns bar mirrors 110 longitudinally. The cluster board 58 is then positioned atop screws 56 with same being adjusted until all lenses 68 in cluster board 58 are directed to aperture 44, thus creating the discreet images to be viewed at the individual car screens. The discreet images being projected are in an aligned position for reflecting by bar mirrors 110. Each bar mirror 110 is then adjusted by sliding brackets 100 along slot 98 of raiser 96 until the alignment of a predetermined number of rows of discreet images to be reflected is reached. Bar mirrors 110 are then rotated about rod 104 until the group of predetermined discreet images being reflected is directed to the location of the point mirrors, which, in turn, directs the images to the car screens. When point mirrors 134 are used, the mirrors are positioned along the tube 120 until a discreet image may be reflected to a car screen. Point mirror 134 would then be positioned to reflect the discreet image to its respective car screen. Through the coaction of screw support 124, plate clamp 126, and blocking plate 128, point mirror 134 is fixed in position to tube 120.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An apparatus for use with a film projector wherein said apparatus operates to project a plurality of images from an image emanating from said projector to a corresponding plurality of viewing locations, said apparatus comprising:

a lens support adapted to support a plurality of lenses at respective positions wherein each lens receives said image from said projector and directs a discrete image therefrom, said lens support including means for independently adjusting the position of each lens with respect to said projector to permit individual focusing of each lens, a plurality of spaced mirrors, each mirror operable to reflect a grouping of said discrete images to an intermediate location, a frame supporting said mirrors in spaced relation from said lens support and from one another, said frame including means for positioning said mirrors to independently align each mirror for reflecting said grouping of said images to said intermediate location, and means for directing said images from their respective intermediate locations to said viewing locations.

2. The combination as in claim 1 wherein said lens support includes a cluster board, said cluster board having a plurality of holes located therein and arranged in groups with the axis of each hole directed toward said projected image.

3. The combination as in claim 2 wherein said lens support includes a plurality of lens tubes, means for fixedly locating each one of said plurality of lenses within a lens tube, each lens tube being adjustably supported within a corresponding hole of said cluster board thereby permitting the individual focusing of each of said lenses with respect to said projected image.

4. The combination as in claim 3 wherein said frame includes a means for supporting said cluster board in three point suspension, said cluster board supporting means further providing a means for adjusting the pitch and roll of said cluster board relative to said mirrors.

5. The combination as in claim 3 wherein said frame includes a three point suspension means for supporting said mirrors, said three point suspension means thereby providing a pitch and roll adjustment for said mirror means relative to said projector.

6. The combination as in claim 3 including a movable reflector supported by said frame, said reflector operable to reflect the projected image from said projector to said lenses within said cluster board.

7. The combination as in claim 1 wherein said frame includes a three point suspension means for supporting said lens support.

8. The combination as in claim 1 wherein said frame includes a three point suspension means for supporting said mirrors, said three point suspension means thereby permitting the adjustment of pitch and roll of said mirrors with respect to said projected image.

* * * * *